United States Patent [19]
Flinner et al.

[11] 3,930,516
[45] Jan. 6, 1976

[54] BALLCOCK ASSEMBLY

[75] Inventors: Vaughn D. Flinner, Big Prairie; Dana D. Zody, Perrysville, both of Ohio

[73] Assignee: Mansfield Sanitary Inc., Perrysville, Ohio

[22] Filed: Dec. 5, 1974

[21] Appl. No.: 529,733

[52] U.S. Cl. .................. 137/215; 137/436; 137/312
[51] Int. Cl.² ........................................ F16K 24/00
[58] Field of Search ........... 137/215, 436, 437, 592, 137/418, 312

[56] References Cited
UNITED STATES PATENTS

| | | | |
|---|---|---|---|
| 2,195,797 | 4/1940 | Groeniger | 137/592 |
| 2,657,703 | 11/1953 | Bletcher | 137/215 |
| 2,706,998 | 4/1955 | Bletcher et al. | 137/436 |
| 2,791,235 | 5/1957 | Smith | 137/437 |
| 3,084,472 | 4/1963 | Feik | 137/592 X |
| 3,109,447 | 11/1963 | Jacobson | 137/436 |
| 3,332,433 | 7/1967 | Emondson | 137/215 |
| 3,414,005 | 12/1968 | Fulton et al. | 137/436 |
| 3,457,947 | 7/1969 | Fitzgerald | 137/418 |

Primary Examiner—Henry T. Klinksiek
Attorney, Agent, or Firm—Hamilton, Renner & Kenner

[57] ABSTRACT

A ballcock assembly in which a sheath extends upwardly through the fluid within a reservoir tank to support a valve mechanism above the normal level to which fluid will rise in the reservoir tank. An inlet tube which connects a fluid supply line to the valve mechanism extends through the sheath and is wholly isolated from the fluid within the reservoir tank by the sheath. The outermost lateral dimension of the inlet tube and the innermost lateral dimension of the sheath are such that the inlet tube is completely circumscribed by an air space comprising a passageway that extends the full axial extent of the inlet tube between its effective connection to the valve mechanism and its effective connection to a fluid supply line. The passageway is required to communicate with atmosphere at a level beneath the fluid in the reservoir tank and may also communicate with atmosphere at a level above the normal level to which fluid will rise within the reservoir tank.

7 Claims, 3 Drawing Figures

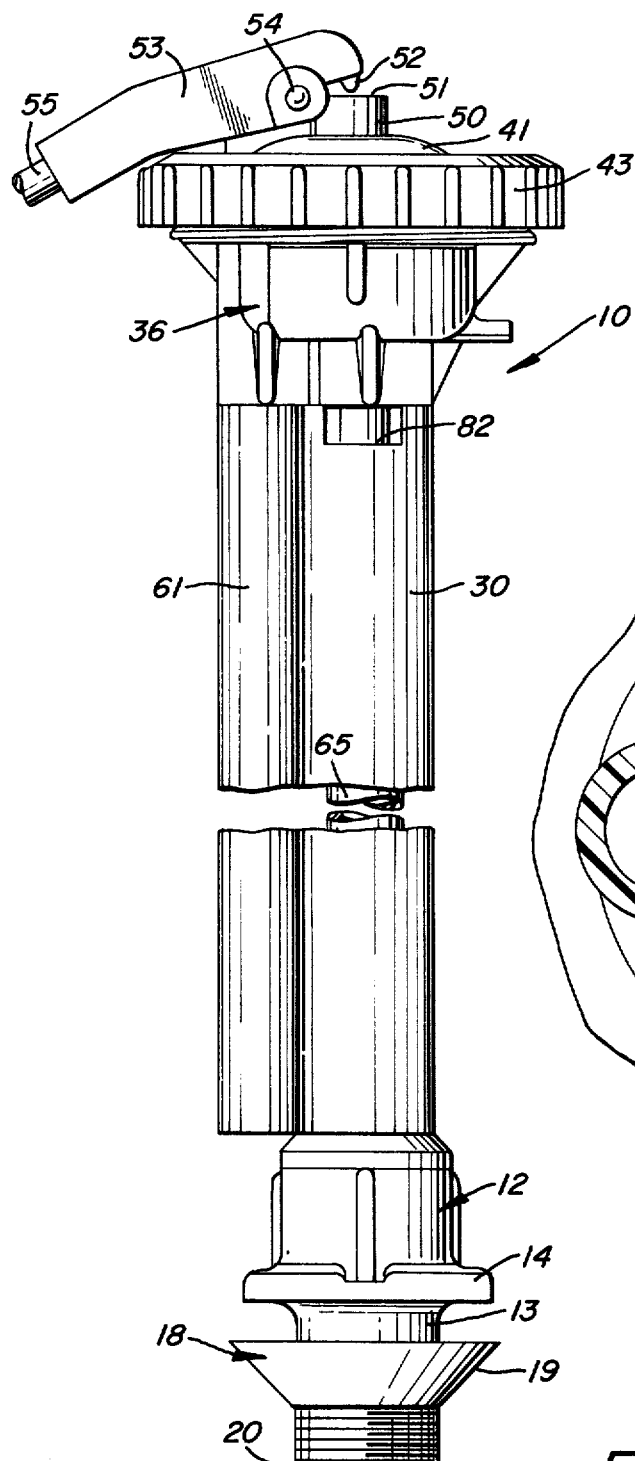
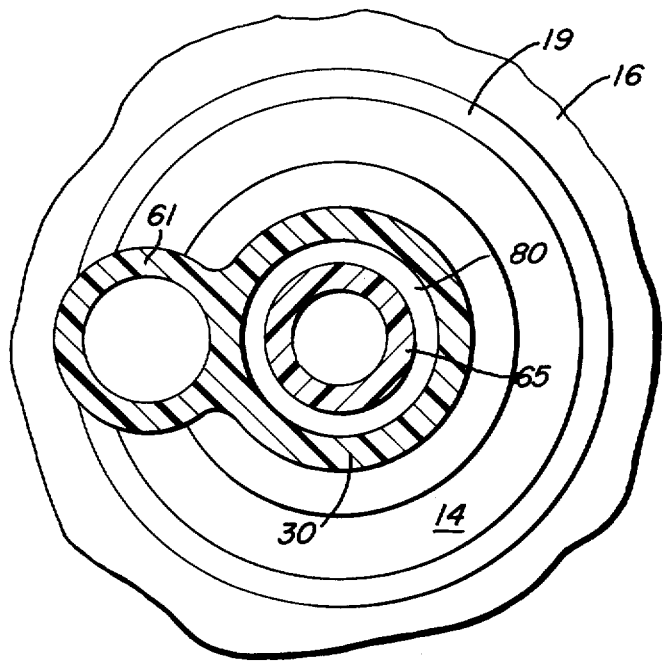
FIG. 3
FIG. 1

BALLCOCK ASSEMBLY

BACKGROUND OF THE INVENTION

This invention relates generally to ballcock assemblies for controlling the admission of flush fluid, normally water, into the reservoir tank used in connection with toilet bowls, and more particularly, to an improved construction which precludes backflow and/or siphoning of the flush fluid from the reservoir tank into the supply line.

Conventional ballcock assemblies generally consist of a metal inlet tube terminating at its lower end with a threaded mounting shank that extends, in sealed relation, through the bottom wall of a reservoir tank for connection to a water supply line. A ballcock valve mechanism is mounted at the upper end of the inlet tube to be actuated by a lever arm and ball float.

Connections between the several parts of a ballcock assembly, irrespective of the particular material from which they are fabricated, give rise to difficulties in assembly and often result in leakage due to corrosion and/or relative movement between the parts. Moreover, leaks can occur along the span of the various parts so that even if the ballcock is of unitary construction it is not necessarily immune from leakage.

Any leakage which permits the flush fluid to flow into the reservoir tank will, upon the occasion of a drop in the pressure within the supply line, allow the flush fluid stored in the reservoir tank to backflow, or to be siphoned, into the supply line.

Some prior art ballcock assemblies are constructed so that the water level in the reservoir tank can rise above the level of the ballcock valve. Here, too, the fluid source can be contaminated by backflow or siphoning in response to a reduction in the pressure of the fluid within the supply line.

SUMMARY OF THE INVENTION

It is, therefore, a primary object of the present invention to provide an improved ballcock assembly in which backflow, or siphoning, of flush fluid from the reservoir tank through any leaks along the span of, and at the connections between, the various components of the assembly and into the fluid supply line is precluded.

It is another object of the present invention to provide an improved ballcock assembly, as above, which does not allow the level of the fluid in the reservoir tank to rise above the level of the valve mechanism therein, thereby precluding backflow, or siphoning, of flush fluid from the reservoir tank into the fluid supply line through the ballcock valve mechanism.

It is a further object of the present invention to provide an improved ballcock assembly, as above, which affords a visual indication when a leak occurs upstream of the ballcock valve mechanism therein.

It is a still further object of the present invention to provide an improved ballcock assembly, as above, which may be readily adapted to afford a visual indication when the fluid within the reservoir tank attempts to rise above a predetermined level.

These and other objects, together with the advantages thereof over existing and prior art forms which will become apparent from the following specification, are accomplished by means hereinafter described and claimed.

In general, a ballcock assembly embodying the concept of the present invention incorporates a mounting shank which extends through, and is sealingly secured to, the base wall of a reservoir tank. A sheath is secured to the mounting shank and extends upwardly through the fluid within the reservoir tank. The body portion of the ballcock assembly is secured to, and supported by, the uppermost end of the sheath. The body portion houses a ballcock valve mechanism that is float operated and which has an intake and an exhaust. The exhaust feeds into the reservoir tank, and the intake is connected to an inlet tube.

The inlet tube extends downwardly through the sheath and into the mounting shank to be connected to a fluid supply line. The inlet tube is positioned within the sheath and mounting shank so, that a passageway which circumscribes the inlet tube is provided. The passageway communicates with atmosphere beneath the reservoir tank, and as a result any leakage within the ballcock assembly and upstream with respect to the valve mechanism will flow downwardly through the passageway and escape to atmosphere. Should the pressure within the fluid supply line drop, the sheath which forms the outer wall of the passageway provides a barrier that precludes any backflow, or siphoning, of the fluid within the reservoir tank back into the fluid supply line.

The sheath of the improved ballcock assembly may also be provided with an overflow aperture to provide a communication between the passageway and atmosphere at a level above the normal level to which fluid will rise within the reservoir tank but below the level of the valve mechanism so that in the event that fluid attempts to rise above a predetermined level — that of the overflow aperture — it will not inundate the valve mechanism but will flow through the aperture, down the passageway and into the atmosphere beneath the reservoir tank.

One preferred embodiment of a ballcock assembly incorporating the concept of the present invention is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 1 is a side elevation of a ballcock assembly embodying the concept of the present invention;

DESCRIPTION OF A PREFERRED EMBODIMENT

Figure 2:
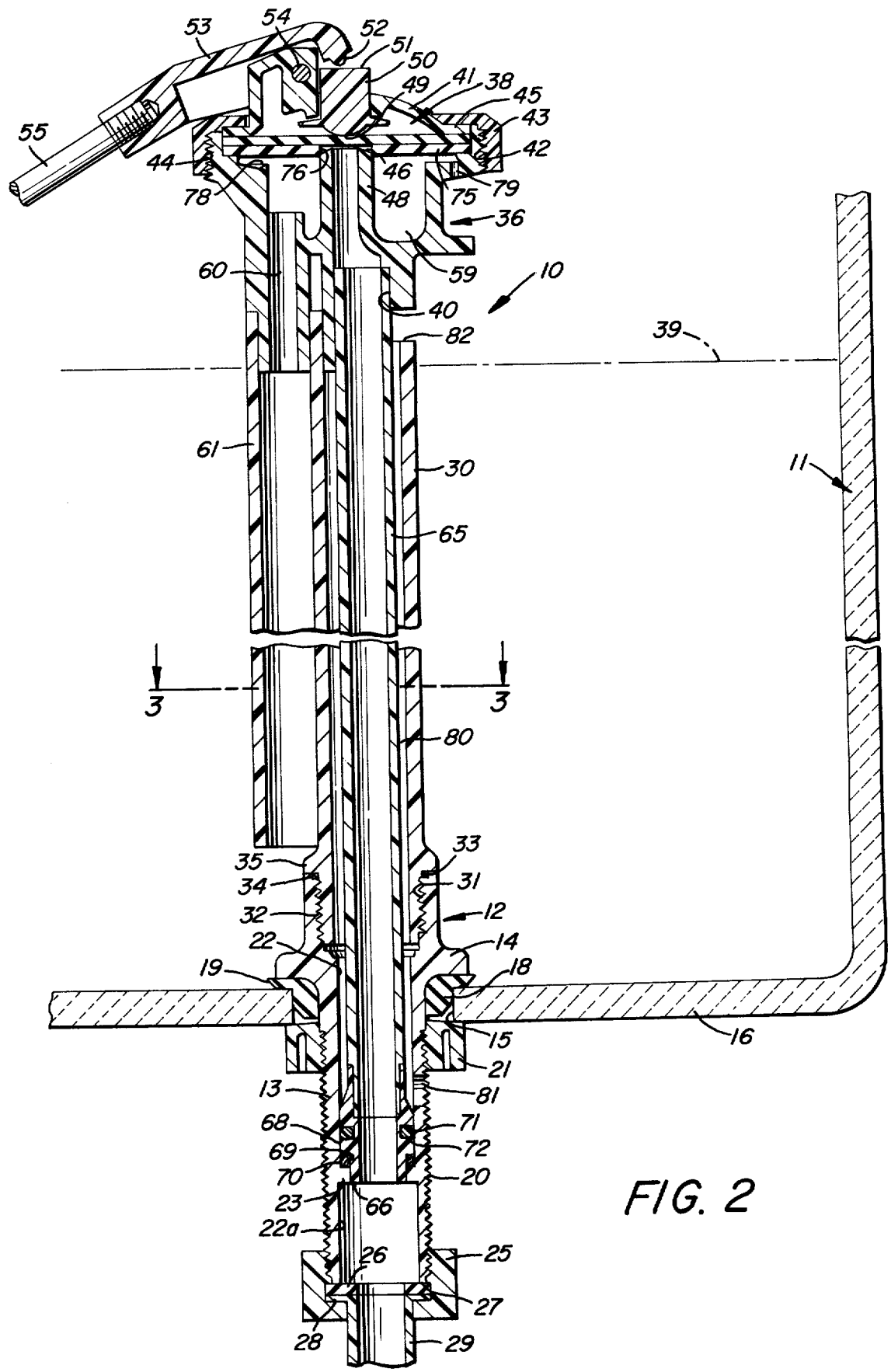
FIG. 2 is a vertical cross section through the ballcock assembly represented in FIG. 1 and further depicting the ballcock assembly operatively mounted through the base wall of a reservoir tank; and, FIG. 3 is an enlarged horizontal cross section taken substantially on line 3—3 of FIG. 2.

Referring more particularly to the drawings, an improved ballcock assembly embodying the concept of the present invention is designated by the numeral 10. The ballcock assembly 10 is secured within a reservoir tank 11 such as the typical flush tank used in combination with toilet bowls. As shown, the preferred embodiment of the ballcock assembly 10 employs a mounting shank 12 for securing it to the reservoir tank 11.

The mounting shank 12 has a tubular body portion 13 that extends downwardly from a radially directed stop flange 14. The tubular body portion 13 extends through an opening 15 provided in the base wall 16 of the reservoir tank 11, and an annular shank gasket 18, which embraces the body portion 13, is interposed between the stop flange 14 and the base wall 16. To facilitate a liquid tight seal between the body portion 13 and the opening 15, the gasket 18 presents a downwardly and outwardly directed conical engaging surface 19.

A mounting nut 21 is received on threads 20 provided along the exterior surface of the tubular body portion 13 beneath the gasket 18. Tightening the mounting nut 21 compresses the gasket 18 between the base wall 16 and the stop flange 14 sealingly to secure the ballcock assembly 10 in operative position with respect to the reservoir tank 11.

The mounting shank 12 has a preferably cylindrical bore 22 extending axially therethrough but preferably interrupted in proximity to the lowermost end to provide a radially inwardly directed, annular locating flange 23, the purpose for which will be more fully hereinafter explained. That portion 22a of the bore 22 located axially below the flange 23 is preferably of such an internal diameter that one may, if the shank 12 were to be fabricated of metal, effect a sweat connection to a supply line. On the other hand, the threads 20 may also receive a coupling nut 25 by which sealingly to compress a gasket 26 between the lower end 27 of the mounting shank 12 and a flange 28 on the fluid supply line 29, as is well known to the art.

Secured to, and extending upwardly from, the mounting shank 12 is a hollow sheath 30. The sheath 30 may be an integral part of the mounting shank 12 or, as shown, the sheath 30 may comprise a separate element that is secured to the mounting shank by a liquid impervious connection. In this regard, the upper portion of the bore 22 may be counterbored and internally threaded, as at 31, to receive the corresponding threads 32 on the lower extremity of the sheath 30. To assure a liquid tight seal, a cove 33 may be provided at the upper end of the threads 31 to seat an O-ring 34 that can be sealingly compressed thereagainst by a radially outwardly directed shoulder 35 on the sheath 30.

The upper extremity of the sheath 30 is attached to, and supports, the body portion 36 of the ballcock assembly 10. One purpose of the sheath 30 is to support the body portion 36 — and the valve mechanism 38 contained therein — not only at a level above that to which fluid will normally rise in the reservoir tank 11 but also at a level above that to which the fluid can ever rise in the reservoir tank. The normal level is indicated by the numeral 39 in the drawings and the highest level will be hereinafter more fully explained. By simply locating the connection between the sheath 30 and the body portion 36 above the highest level to which the fluid will rise in the reservoir tank 11 a relatively simply connection may be effected therebetween. In the preferred embodiment depicted, the upper end of the cylindrical sheath 30 is received within a corresponding annular recess 40. Polyvinyl chloride or any other suitable plastic having sufficient strength and durability, is an excellent material from which both the sheath 30 and body portion 36 may be molded, and when such material is used a suitable adhesive may be employed to secure the sheath 30 within the recess 40.

A cap 41 is removably mounted on the body portion 36 of the ballcock 10 — as by engagement of the thread 42 on cap nut 43 with corresponding threads 44 on the body portion 36 — and secures a resilient diaphragm disc 45 across a valve seat 46 presented at the top of an intake duct 48 formed within the body portion 36. The diaphragm disc 45 is selectively sealed against the valve seat 46 by the convex, engaging surface 49 on the lower end of a plunger 50 that is vertically slidable within the dome-shaped cap 41.

The upper end surface 51 of the plunger 50 is engageable by one end 52 of a lever arm 53 pivotally mounted on the cap 41 by a fulcrum pin 54. A conventional ball float (not shown) is secured to the outermost end of the lever arm 53 by a connecting rod 55.

The inlet duct 48 extends upwardly through an annular well comprising a distributing chamber 59 from which the fluid discharges through an exhaust port 60 formed in the body portion 36. To reduce the noise attendant upon filling of the reservoir tank 11, the outlet port 60 may communicate with the tank 11 through a hush tube 61 which may be conveniently formed integrally with, and extend longitudinally along, the outer surface of the cylindrical sheath 30.

An inlet tube 65 may be integrally formed with the intake duct 48, or the uppermost end of the inlet tube may be sealingly secured to the body portion 36 so as to communicate solely with the intake duct 48.

The inlet tube 65 extends downwardly from the intake duct 48 concentrically through the sheath 30 and into the bore 22 through the mounting shank 12. The lowermost extremity of the inlet tube 65 communciates solely with the fluid supply line 29, and this may be accomplished by a cooperative interaction between the inlet tube 65 and the mounting shank 12.

As depicted, the tip of the inlet tube 65 may be of a diameter such that it comprises a pilot 66 which is insertably received within the inner diameter of the annular, locating flange 23. Axially upwardly of the pilot 66 the inlet tube presents a rim portion 68 that closely fits within the bore 22. The rim portion is recessed at 69 to accommodate an annular gasket 70 that is sealingly compressed between the rim portion 68 and the locating flange 23 and is also recessed at 71 to accommodate an O-ring 72 that sealingly engages the bore 22.

With the construction heretofore described fluid from the pressurized supply line 29 will flow through portion 22a of bore 22, past the annular locating flange 23, along the inlet tube 65 and into the intake duct 48. Flow between the intake duct 48 and the distributing chamber 59 is regulated by the diaphragm disc 45, as controlled by the plunger 50 in response to the vertical disposition of the ball float presented from connecting arm 55.

An annular body seal 75 underlies the diaphgram disc 45 and is also supported along its outer periphery between the body portion 36 and the cap 41 by the clamping action of the cap mounting nut 43. Body seal 75 has a central aperture 76 which surrounds the inlet duct 48, but the seal 75 is sufficiently flexible that the pressure of the fluid entering beneath the diaphragm disc 45 freely distorts the body seal 75 to permit the fluid to flow into the distributing chamber 59. Distortion of the body seal 75 seals it against the annular seat 78 to preclude the flow exiting from the distributing chamber 59 through the siphon breaking slots 79 in the body portion 36, and yet the body seal 75 is sufficiently resilient that it will readily disengage from the seat 78 should any subatmospheric pressure occur in the supply line 28, thereby effecting a siphon break by the admission of air through slots 79 to preclude backflow.

The spaced relationship between the inlet tube 65 and the sheath 30 continues into the mounting shank 12 and comprises a passageway 80 that circumscribes the inlet tube 65 and extends therealong for the full axial extent between its effective connection to the inlet of the valve mechanism 38 — i.e., the sealed juncture of the inlet tube 65 to the body portion 36 — and its effective connection to the supply line 28 — i.e., the sealed juncture of the inlet tube 65 to the mounting shank 12.

To effect at least one purpose of the subject invention the passageway 80 must communicate with atmosphere below the reservoir tank 11. As shown in the drawings, at least one aperture 81 opens from the passageway 80 radially through the tubular body portion 13 of mounting shank 12 below the mounting nut 21 as it is positioned sealingly to secure the mounting shank 12 to the base wall 16 of the reservoir tank (FIG. 2). Therefore, should any leak develop in the inlet tube 65, or the connections between either the inlet tube 65 and mounting shank 12 or the inlet tube 65 and the body portion 36, this fact will be signalled by spillage of fluid out through the aperture 81 and onto the floor. By the same token, should the pressure within the supply line 29 drop below that available from the fluid within the reservoir tank 11, the sheath 30 prevents access between the fluid within the reservoir tank 11 and any such leak. Moreover, the constant communication of the passageway 80 with atmosphere precludes any siphoning effect that might occur as a result of a pressure drop within the supply line.

A second, or overflow, aperture 82 may also open from the passageway 80 radially through the ballcock assembly 10, but the second aperture 82 is located above the normal level 39 of the fluid within the reservoir tank 11. In fact, the overflow aperture 82 passes through the sheath 30 and thereby delineates the highest level to which fluid can rise within the reservoir tank 11 because, when the fluid reaches the level of aperture 82, it will flow through that aperture, downwardly along the passageway 80 and out the first, or escape, aperture 81. Thus, by placing the valve mechanism 38 at a level higher than the level of the overflow aperture 82 inundation of the valve mechanism 38 by the fluid within the reservoir tank 11 will be foreclosed so that backflow through the valve mechanism will be precluded. It should, of course, be appreciated that many flush control valves incorporate an overflow. If a ballcock assembly provided with an overflow aperture 82 of the type disclosed in the present invention is used with a flush control valve having an independent overflow, the level of the overflow aperture 82 should be above the level of the flush valve overflow to serve as a backup rather than the primary fluid level control.

It should now be apparent that a ballcock assembly incorporating the concept of the present invention obviates siphoning, or backflow, of fluid from the reservoir tank in which the ballcock is mounted into the supply line connected to the ballcock, gives a visual indication of any leakage and otherwise accomplishes the objects of the invention.

We claim:

1. In combination with a fluid reservoir tank having a base wall and a desired fluid level, a ballcock assembly, said ballcock assembly comprising; a mounting shank extending through said base wall, means sealingly to secure said shank to said base wall, said mounting shank having an annular locating flange below the tank base wall, a sheath secured to said mounting shank and extending upwardly through said reservoir tank, a body portion secured to said sheath upwardly of said desired fluid level, a valve having an intake and an exhaust, said exhaust communicating with the interior of said reservoir tank, an inlet tube connected to the intake of said valve and extending downwardly through said sheath and at least partially through said mounting shank, said inlet tube having a pilot to be insertably received within the inner diameter of said annular locating flange, said inlet tube having a rim portion axially upward of said pilot that closely fits within said mounting shank, said rim portion having means for sealing the connection between said inlet tube and said mounting shank, said inlet tube being positioned with respect to said sheath and said mounting shank to define a passageway that circumscribes said inlet tube, and a first aperture located below said means sealingly to secure said shank to said base wall by which said passageway communicates with atmosphere.

2. A combination, as set forth in claim 1, further comprising a second aperture opening through said sheath at a level higher than the desired fluid level in said reservoir tank by which said passageway communicates with atmosphere.

3. A combination, as set forth in claim 1, in which said inlet tube is connected to the fluid supply line in spaced relation below said means sealingly to secure said shank to said base wall and said first aperture penetrates said shank within the span of said spaced relation.

4. A ballcock assembly comprising; a mounting shank, a body portion, a valve mechanism housed in said body portion, said valve mechanism having an intake and an exahust, a sheath connecting between said mounting shank and said body portion, said mounting shank having an annular locating flange, an inlet tube having first and second, opposite ends, means effectively connecting said first end for communication with the intake of said valve mechanism, said inlet tube extending through said sheath and at least partially into said mounting shank, said inlet tube having a pilot to be insertably received within the inner diameter of said annular locating flange, said inlet tube having a rim portion axially upward of said pilot that closely fits within said mounting shank, said rim portion having means for sealing the connection between said inlet tube and said mounting shank, a passageway within said sheath and circumscribing said inlet tube along the extent thereof between its effective connections to said valve mechanism and said fluid supply source, an aperture through which said passageway communicates with atmosphere.

5. A ballcock assembly, as set forth in claim 4, in which said aperture communicates with said passageway at substantially the lowest elevation thereof.

6. A ballcock assembly, as set forth in claim 4, in which said aperture communicates with said passageway at substantially the highest elevation thereof.

7. A ballcock assembly, as set forth in claim 4, in which said aperture communicates with said passageway at substantially the lowest elevation thereof and in which a second aperture communicates with said passageway at substantially the highest elevation thereof.

* * * * *